J. W. KOHLHEPP.
CARCASS SCRAPING AND POLISHING MECHANISM.
APPLICATION FILED MAY 9, 1912.

1,167,573.

Patented Jan. 11, 1916
6 SHEETS—SHEET 1.

Fig. 1

WITNESSES
J W Angell
Charles W Hills Jr

INVENTOR
John W Kohlhepp
by Charles W Fires
Atty.

UNITED STATES PATENT OFFICE.

JOHN W. KOELHEPP, OF CHICAGO, ILLINOIS, ASSIGNOR TO THE ALBRIGHT-NELL COMPANY, A CORPORATION OF ILLINOIS.

CARCASS SCRAPING AND POLISHING MECHANISM.

1,167,573.  Specification of Letters Patent.  Patented Jan. 11, 1916.

Application filed May 9, 1912. Serial No. 696,092.

*To all whom it may concern:*

Be it known that I, JOHN W. KOELHEPP, a citizen of the United States, and a resident of the city of Chicago, in the county of Cook and State of Illinois, have invented certain new and useful Improvements in Carcass Scraping and Polishing Mechanisms; and I do hereby declare that the following is a full, clear, and exact description of the same, reference being had to the accompanying drawings, and to the numbers of reference marked thereon, which form a part of this specification.

This invention relates to carcass scraping and polishing mechanisms of that class set forth in my prior application for patent therefor, filed on the 12th day of February, 1912, Serial No. 677,133.

It has been found in practice that said machines as set forth in my prior application for patent, although operating perfectly and satisfactorily upon the larger carcasses, in some instances left upon the head and flank of small carcasses, a little of the hair and bristles, although thoroughly massaging and cleaning the remainder of the carcass.

It is an object of this invention to afford a construction adapted to thoroughly and completely dehair and polish or massage carcasses of any size likely to be delivered therethrough and to afford equally satisfactory results whatsoever the size of the carcass.

It is an object of the invention also to afford a construction whereby the carcasses in passing through the machine are elevated and supported to be completely in the field of operation of the beaters on the respective beater shafts during the dehairing and polishing operation.

It is a further object of the invention to afford a construction whereby the carcasses fed into the machine are sustained and supported in the field of the beaters wholly or partly above the normal plane of the conveyer, and wherein the carcasses are revolved or rotated in such elevated position by the coaction of the beaters and conveyer.

It is also an object of the invention to afford a construction of greatly increased capacity to permit two or more carcasses to be operated upon simultaneously.

It is furthermore an object of the invention to afford a construction whereby the carcasses are taken directly from the scalding tub and are dehaired and polished while subjected to the heat of, and washed by the water in the scalding tub, and subjected to a spray of clean hot water before delivery from the machine.

It is an object of the invention also to afford a construction wherein the carcasses while supported on, and moved by the conveyer in the field of operation of the beaters, are wholly detached from all parts of the mechanism, leaving the same to move freely in their characteristic manner.

It is also an object of the invention to afford a construction wherein the beaters on one pair of shafts, act to dehair or partly dehair the carcasses, and the beaters on a succeeding pair of beater shafts act to complete the dehairing and polishing of the carcasses before delivery from the machine.

The invention (in a preferred form) is illustrated in the drawings and hereinafter more fully described.

Figure 1:
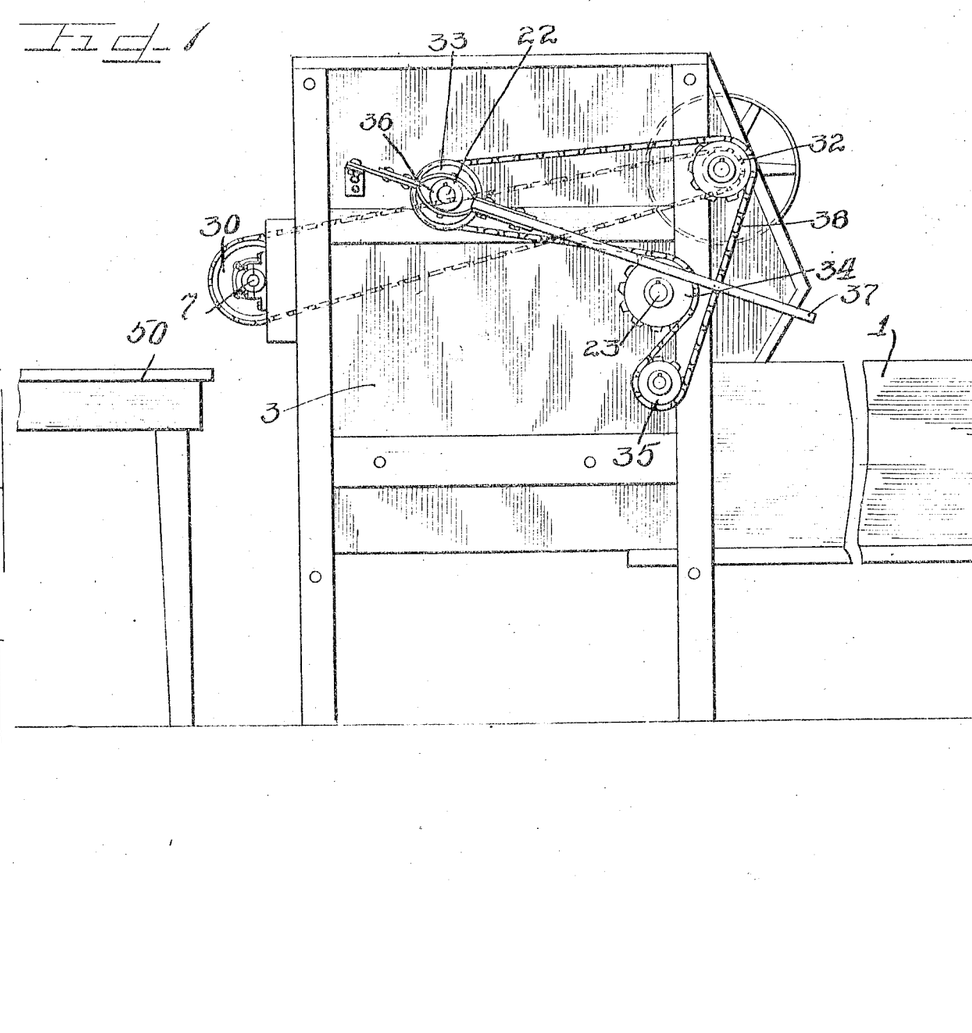
Figure 1 is a view partly broken, of the driving side of the machine, in which but a single pair of beater shafts are employed.
Figure 2:
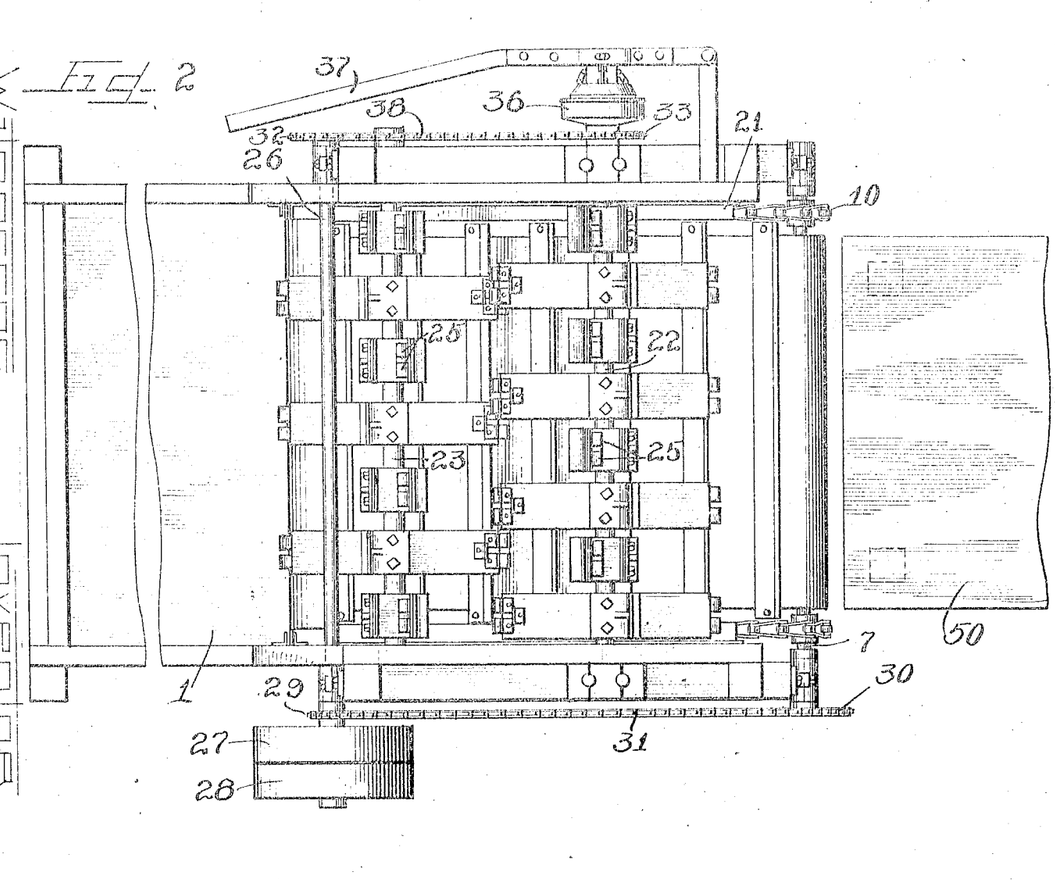
Fig. 2 is a top plan view of the same, partly broken.
Figure 3:
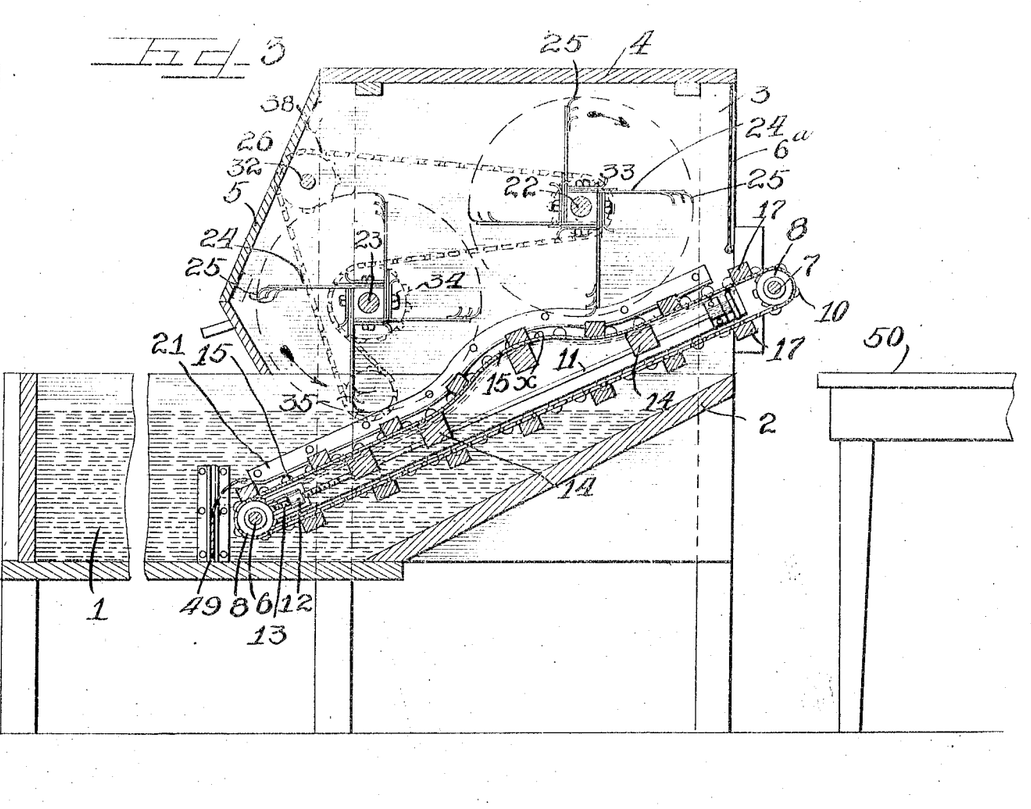
Fig. 3 is a central vertical section thereof.
Figure 4:
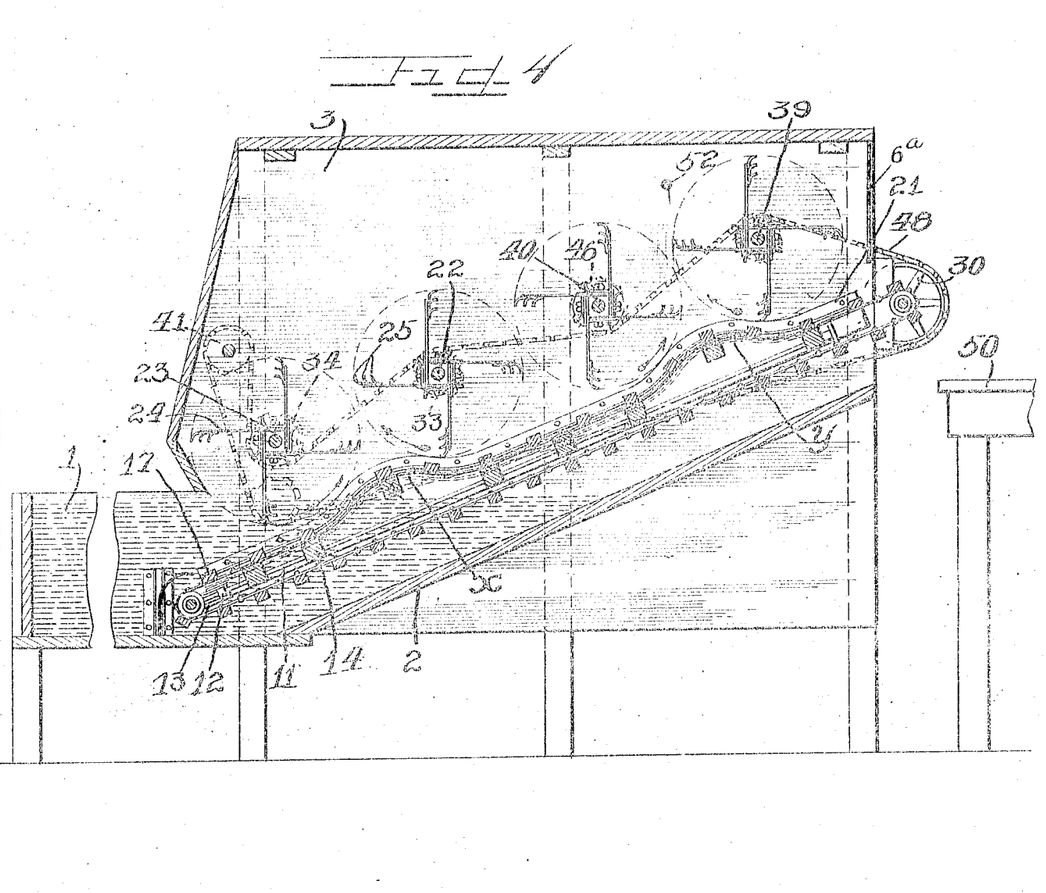
Fig. 4 is a similar sectional view of a machine having two pairs of beater shafts.

As shown in the drawings: 1, indicates the scalding tub, having an upwardly inclined rear end 2, as shown in Figs. 3 and 4. Mounted on the rear end thereof, and extending upwardly a sufficient height above the same, is a frame comprising side members 3, constructed of any suitable material, and either permanently constructed as a part of the structure of the scalding tub or mounted independently thereon, as preferred. A removable top or cover 4, is provided thereon, and as shown also, a front end wall 5, (which may be removable, if desired, or hinged to open outwardly) is secured to close the front end of said upper frame. Any suitable closing means may be provided at the rear end or place of exit for the carcasses. For this purpose, a curtain may be employed, if desired.

Figure 7:
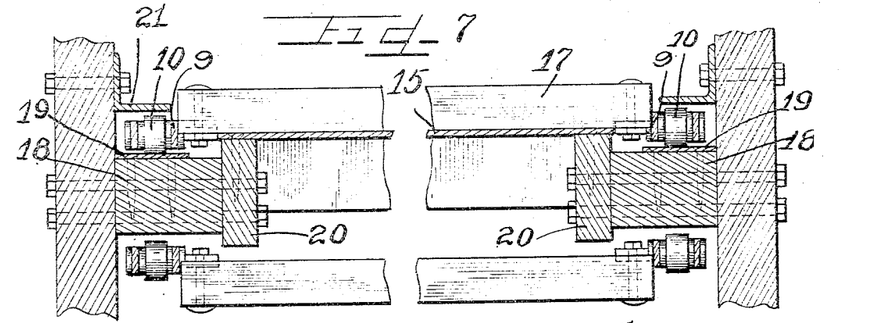
Fig. 7 is an enlarged, fragmentary transverse section of the conveyer.
Figures 8, 9:
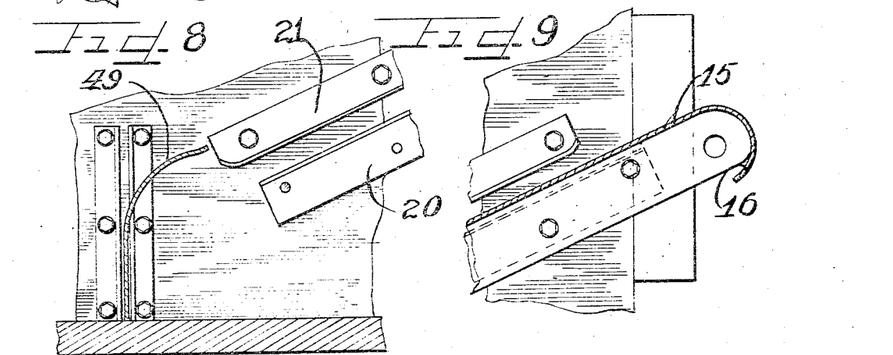
Fig. 8 is an enlarged, fragmentary detail of the car at the lower end of the conveyer.
Fig. 9 is a similar view taken at the upper end of the conveyer.

Journaled near the bottom of the scalding tub, is an idle shaft 6, having sprocket wheels 8, secured thereon near each of the side walls, and journaled at the rear end of the tub and above the top of the tub on said frame, is a driving shaft 7, also provided with sprocket wheels near its ends. Conveyer chains 9, are trained about the corresponding sprocket wheels 8, on said shafts. Said conveyer chains are preferably roller chains—that is to say, are provided with rollers 10, on the pintles in a familiar manner. A tightening device for the sprocket chains is provided at each side of the tub, comprising shafts 11, which are engaged at their upper ends near the upper or driving shafts 7 and provided with a hand wheel, and at their lower ends have threaded engagement, as shown in Figs. 3 and 4, with a suitable nut 12, secured on a bracket 13, engaged at the respective ends of the lower shaft. Said adjusting rods are journaled at intervals in their length, in transverse beams 14, which extend transversely of the scalding tub, and extending over the same and affording a continuous smooth floor for the conveyer, is a deck of sheet metal or other suitable material, indicated by 15. This, as shown, extends for substantially the entire width of the scalding tub and at its lower end extends over the shaft 6, and at its upper end 16, as indicated in Fig. 9, is curved over the shaft to deliver the carcasses clear therefrom. Rigidly secured on the laterally disposed sprocket chains 9, to slide over said deck 15, are transverse bars or lags 17, arranged at suitable intervals apart and of a sufficient size to engage and draw the carcasses upwardly over the deck. Said deck 15, at a point intermediate its ends, is sprung upwardly to afford a convexly curved portion extending above the normal plane of the conveyer, and, as shown, a guide rail 18, is secured to the walls of the scalding tub, shaped on its upper surface to conform to, and parallel the deck 15, though slightly below the same, and having secured at the inner edge of each a longitudinal bar or beam 20, upon which the deck is secured, as shown in Fig. 7, and the upper edge of which conforms to the required shape therefor. As shown, a metal or other suitable bearing plate 19, is secured on the top of the way or guide 18, upon which the rollers 10 track, and engaged to the side walls of the tub to afford an upper guide or way for said rollers, is an angle bar 21, which also, of course, is shaped to conform to the surface of the deck, as shown in Figs. 3 and 4.

Journaled transversely the machine above the conveyer, and as shown, at each side of the raised or upwardly sprung portion of the deck, is an upper beater shaft 22, and lower beater shaft 23, each of which is provided with beaters 24, thereon, preferably constructed of relatively short pieces of canvas belting having suitable thickness and width, provided on the outer end thereof with curved blades 25, as shown in Fig. 3, the curvature of which is directed toward the rotation of said shafts, so that the edges of said curved blades or plates act to strike and beat or scrape the carcass. The length of said beaters is such as to just clear the conveyer, as shown in Fig. 3, and for the beaters on the one shaft to clear the beaters on the other during the rotation thereof. Also, as shown, the position of the lower shaft is such that the beaters thereon dip into the water in the scalding tub to dash the water inwardly and upwardly on the conveyer as the beater shaft revolves. Journaled also transversely the machine and above the lower beater shaft 23, is a driving shaft 26. Secured on said driving shaft are tight and loose pulleys 27 and 28, respectively. Also secured thereon adjacent the tight pulley is a sprocket wheel 29, corresponding with the sprocket wheel 30, secured on the upper conveyer shaft 7, and trained about the same is a sprocket chain 31, whereby the drive of the same is effected by the main driving shaft 7. A sprocket wheel 32, also is secured on the opposite end of the main driving shaft 26, and likewise a sprocket wheel 33, and 34, are secured on the respective beater shafts. An idle sprocket wheel 35, is secured upon a suitable stud shaft below the beater shaft 23.

Any suitable clutch 36, may be provided upon the upper or rear beater shaft to engage the sprocket wheel 33, rigidly thereto to drive the shaft from the sprocket wheel or disengage such sprocket wheel from the shaft to permit the shaft to come to rest, and a suitable lever 37, which extends to the operating position beside the scalding tub, is provided to operate the clutch to start and stop the upper beater shaft. Trained about the various sprocket wheels on said driving shaft and on the beater shafts on said idle sprocket wheel 35, is a sprocket chain 38. This, as shown, is trained over the sprocket wheel 32, on the driving shaft and beneath and around the idle sprocket wheel 35, thence forwardly and over the sprocket wheel 34, on the lower beater shaft, thence rearwardly beneath, around and over the sprocket wheel 33, on the clutch member for the upper beater shaft, so that the beater shafts are thereby rotated oppositely with the beaters at the lower side of the shaft, striking upwardly and inwardly, while those on the upper shaft at their lower side strike downwardly and outwardly, as indicated by the arrows in Fig. 3.

Figure 5:
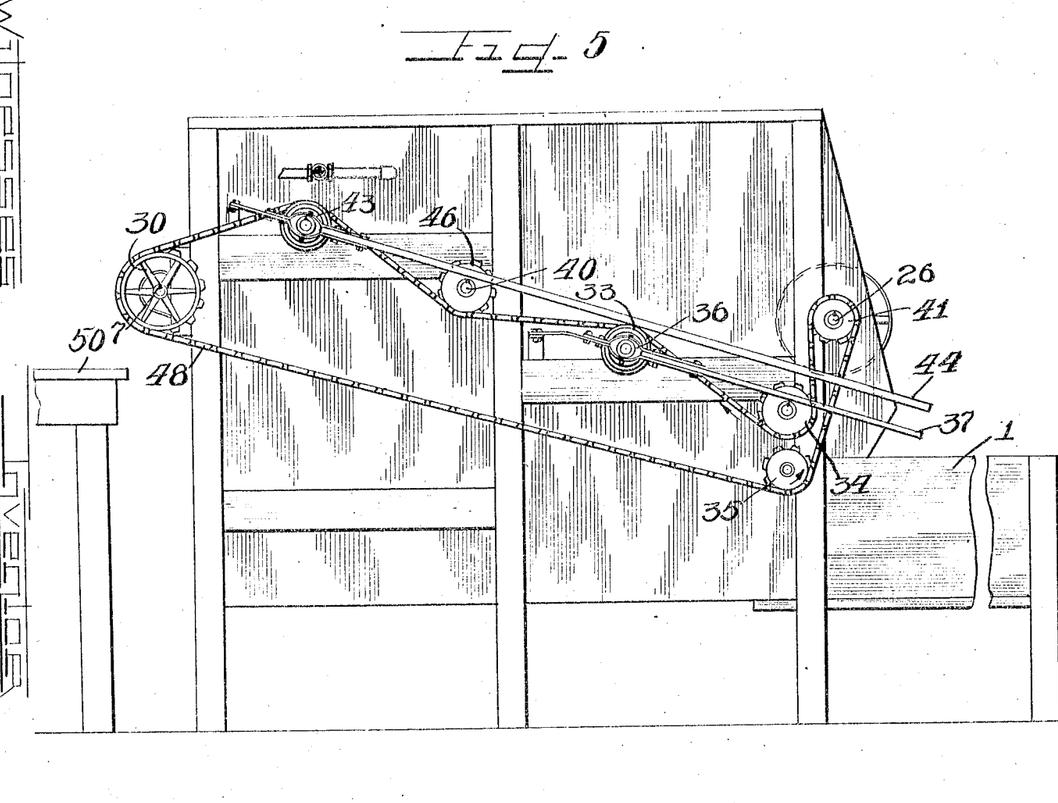
Fig. 5 is a view in elevation of the driving side of the same.
Figure 6:
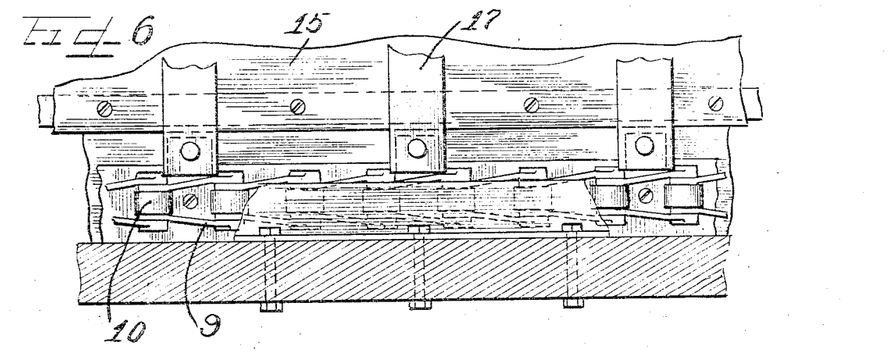
Fig. 6 is an enlarged fragmentary top plan view of the conveyer and guides therefor.

The construction illustrated in Figs. 4 and 5 is identical in all particulars with that before described, excepting that four beater shafts rotating in pairs, are provided instead of two, and, of course, the drive is slightly modified to accommodate this arrangement. As shown, the upper shaft 39, of the upper pair of beater shafts corresponds with the shaft 22, before described, while the lower beater shaft 40, of the upper pair corresponds with the shaft 23, before described.

As shown, the conveyer is made proportionately longer and the deck 15, thereof, is bent or sprung upwardly to afford a rounded or convex supporting surface X, between the lower pair of beater shafts, and an upper convex supporting surface Y, between the upper pair. The drive is correspondingly modified so that alternate shafts rotate in the same direction. For this purpose, as shown, the main driving shaft 26, is provided with a sprocket wheel 41. The clutch 36, and 42, for the respective upper beater shafts of each pair, are arranged as before described, the levers 37 and 44, extending conveniently to the position of the operator to enable the clutches to be actuated.

The sprocket wheel 34, for the lower beater shaft and the sprocket wheel 33, on the clutch 36, for the second beater shaft, are as before described. A sprocket wheel 46, is provided on the third beater shaft 40, and a suitable sprocket wheel is provided on the clutch 42, for the upper beater shaft. A sprocket chain 48, is trained around the sprocket wheel 41, on the main driving shaft, thence beneath the sprocket wheel 34, on the first beater shaft, over the sprocket wheel 33, on the clutch for the second beater shaft, beneath the sprocket wheel 46, for the third beater shaft, and over the sprocket wheel on the clutch 42, for the fourth beater shaft 39, thence around the sprocket wheel 30, on the conveyer driving shaft 7, around the idle sprocket wheel 35, and thence to the sprocket wheel 41, on the main shaft again. This arrangement obviously drives the beater shafts of each pair oppositely— that is to say, the lower beater shaft of each pair rotates so that the beaters thereon strike upwardly and inwardly, while the upper beater shaft of each pair rotates to strike downwardly and toward the lower beater shaft.

The operation is as follows: The carcasses are deposited in the scalding tub, as shown, and when sufficiently scalded, the operator advances them one by one onto the lower end of the conveyer, the guide or deflector 49, (which comprises a vertically adjustable transverse gate having the upper edge curved rearwardly over the end of the conveyer) serving to prevent the carcasses passing out of the conveyer until directed thereto by the conveyer. The carcasses are delivered onto the conveyer transversely and are carried thereby upwardly into the field of operation of the beaters on the first beater shaft, which striking upwardly and inwardly, assists in the loading of the carcasses upon the conveyer. When the carcasses, however, have advanced with the conveyer into position to be struck by the downwardly acting beaters on the next succeeding shaft, the further progress of the carcass is arrested because of the action of such beaters and instead, the carcass is rotated on the conveyer in position to be operated upon by the beaters of both shafts and between said shafts. The raised portion X, of the deck of the conveyer serves to elevate and support the carcasses, so that the beaters on both shafts act to strike all parts thereof. Preferably, the upper shaft of each pair is driven at a higher rate of speed than the lower shaft, this being accomplished by engaging the larger sprocket wheel on the lower beater shaft, so that the action of the beaters on the upper shaft, assisted by gravity, will counteract the draft of the conveyer and the force exerted by the beaters on the lower shaft. The carcasses are thus retained in the field of operation of the beaters on both shafts until (in the machines where but a single pair of beaters is employed) the operation is completed. The clutch is then released by the operator by means of the lever therefor, thus immediately stopping the action of the upper beater shaft and permitting the carcasses to be drawn by the conveyer therepast and delivered upon the table or runway 50, at the rear of the machine, while the hair and other refuse is drawn by the conveyer chain over the deck and falls to the floor between the machine and the runway. Any hair or other material finding its way into the rear end of the tank is prevented from passing into the scalding portion of the tank by the gate 49, before described.

Where more than one pair of beater shafts is employed, as shown in Figs. 4 and 5, the operation is the same except that the dehairing and polishing of the carcasses is but partly completed by the beaters on the first pair of beater shafts when the operator permits the partly cleaned carcasses to pass to the next pair of beater shafts, and at the same time delivers other carcasses to the first pair. A much larger capacity per hour is thus afforded, inasmuch as the beaters on the first shaft will do the greater part of the dehairing while those on the second pair of shafts complete the dehairing and polish the carcasses. In this way the operation is continuous.

Of course, other means may be employed for elevating the carcasses, or the heads and hams of the carcasses slightly while in the field of the beaters, and the simple means illustrated is intended merely as illustrative of the preferred construction for the purpose, the object being to afford a device whereby small carcasses may be treated as efficiently as larger ones.

Of course, inasmuch as the beaters for the first or lower beater shaft dip slightly into the water in the scalding tub, it follows that the carcasses are at all times sprayed with the water at exactly the proper temperature for best work, and, inasmuch as the dehairing mechanism is mounted upon the scalding tank, the carcasses during the entire operation are subjected to the scalding temperature and are never permitted to cool and set the hair and bristles, as in the instance of those machines where the carcasses must be removed from the scalding tub and transported to a separate and distinct machine.

Preferably, a spray pipe 52, is connected to spray the carcasses when operated upon by the second pair of beaters, and clean hot water is delivered therethrough to the carcasses to thoroughly wash the same. Such spray pipe may also be employed with the two shaft machine, if desired. It is not necessary or essential, however, to the proper cleaning and polishing of the carcasses, and may be dispensed with where but a single pair of beater shafts are employed.

Of course, I am aware that various details of the construction may be varied. I therefore do not purpose limiting the patent to be granted on this application otherwise than necessitated by the prior art.

I claim as my invention:

1. A scalding tub, a carcass dehairing and polishing machine mounted thereon to receive the carcass directly therefrom and to dehair and polish the carcasses, said machine comprising dehairing mechanism, and means projecting the carcasses beyond normal into close relation with said mechanism while subjected to the scalding temperature of the water therein.

2. The combination with a scalding tub of a dehairing and polishing machine mounted thereon to dehair and polish the carcasses before removal from the tub, dehairing mechanism, a part of the dehairing mechanism acting while cleaning the carcasses to continuously dash the hot water over the carcasses, and mechanism abnormally elevating the same into close relation with said dehairing mechanism.

3. A device of the class described embracing a scalding tub and a dehairing machine mounted on one end thereof and acting to dehair and clean the carcasses while subjected to the heat of the water in the tub, said machine comprising dehairing mechanism, and means advancing and withdrawing the carcasses relative the field of said dehairing mechanism as the carcass moves past the same.

4. A device of the class described embracing a scalding tub, a dehairing machine mounted thereon to receive the carcasses immediately therefrom while subjected to the heat of the water in the tub and embracing in part an inclined conveyer and a pair of oppositely rotating beater shafts acting above the conveyer to strike and retain the carcasses therebetween, and a raised portion at each side of the conveyer adapted to elevate the heads and hams of the animals to be cleaned into the field of operation of the scraping mechanism.

5. A carcass dehairing and polishing machine adapted for close association with a scalding tub, embracing a pair of rotative beater shafts, beaters thereon, the one striking upwardly and inwardly of the machine, the other striking downwardly and inwardly therefrom, a conveyer for moving the carcasses freely to the beaters on said shafts and acting together with said beaters to continuously rotate the same while in the field of operation of the beaters, a raised portion of the conveyer intermediate the beaters adapted to elevate and support the carcasses while operated on thereby, and means for passing the carcasses past the upper beater shaft and to a place of discharge.

6. In a device of the class described the scalding tub, an inclined conveyer extending thereinto to deliver the carcasses therefrom, lower and upper pairs of beater shafts, each comprising a beater shaft having beaters thereon, those on the lower striking upwardly and inwardly, those on the upper striking downwardly and opposite to the direction of travel of the upper run of the conveyer, mechanism for throwing the upper beater shaft of each pair out of driving relation to permit the carcasses to move therepast on the conveyer, and means delivering a spray of hot clean water on said carcasses while operated by one or both pairs of beater shafts.

7. In a machine of the class described an inclined conveyer, a plurality of pairs of oppositely rotating beater shafts journaled above the same, beaters thereon, means for driving the shafts of each pair oppositely for the beaters on the lower of each pair to strike upwardly and inwardly in the direction of travel of the upper run of the conveyer and the upper to strike downwardly and oppositely from said direction of travel of the conveyer, means supporting the carcasses above the normal plane of the conveyer while operated upon by the respective beaters, mechanism throwing the upper beater shaft of each pair out of drive independently to permit the delivery of the carcasses therepast, and means spraying the carcasses with hot water.

8. In a machine of the class described an inclined conveyer, a plurality of pairs of oppositely rotating beater shafts journaled above the same, beaters thereon, means for driving the shafts of each pair oppositely for the beaters on the lower of each pair to strike upwardly and inwardly in the direction of travel of the upper run of the conveyer and the upper to strike downwardly and oppositely and at a higher rate than the lower beaters, means supporting the carcasses above the normal plane of the conveyer while operated upon by the respective beaters, mechanism for throwing the upper beater shaft of each pair out of drive independently to permit the delivery of the carcasses therepast, and means spraying the carcasses with hot water.

9. In a device of the class described, beaters, mechanism for moving the carcasses upwardly into the field of, and intermittently elevating the same at predetermined points toward the beaters, oppositely rotating beater shafts, and means throwing one of the beater shafts out of action to permit the passage of the carcasses therepast.

10. A machine of the class described, comprising a scalding tank, a conveyer partially submerged therein, and a plurality of beater-shafts, alternate ones thereof rotating in the same direction.

11. A machine of the class described comprising a scalding tank, a conveyer partially submerged therein, a plurality of beater-shafts and means for disconnecting the drive of alternate ones simultaneously or independently.

12. A machine of the class described comprising a scalding tank, a conveyer partially submerged therein, a plurality of beater-shafts, alternate ones rotating in the same direction, a clutch member for disconnecting the drive from alternate shafts, and a driving member driving all of said shafts simultaneously.

13. A machine of the class described comprising a scalding tank, a conveyer and a plurality of beater-shafts, alternate ones rotating in the same direction, and a continuous chain driving each of said shafts simultaneously.

14. A machine of the class described comprising a scalding tank, a conveyer, beaters journaled thereover, and a tortuous track for said conveyer adapted to project the carcass into the field of the beaters.

15. A machine of the class described comprising a tank, a series of beaters, and a conveyer adapted, independent of other means, to intermittently and successively project a carcass into the field of the beaters.

16. A device of the class described comprising a scalding tank, a conveyer, a plurality of pairs of beaters, and means retaining the carcass and releasing the same relative a pair of said beaters independently of the other beaters.

17. In a machine of the class described revoluble supporting and dehairing means for the carcass, a plurality of rotating scraping mechanisms coacting therewith, and means acting to elevate the carcasses beyond normal in their progress through the machine.

18. In a hog scraping machine means acting to advance the carcass, and means acting intermittently to elevate the carcass beyond normal, and dehairing elements adapted to be thrown out of action during the advancement of said carcass.

19. In a hog scraping machine a supporting and dehairing element acting to advance the carcass and elevate the same intermittently, and dehairing mechanisms rotating thereabove respectively to assist and retard the advancement of the carcass.

20. In a hog scraping machine dehairing elements, and supporting means for the carcass adapted to successively project the carcass out of a normal path of movement into the field of action of said elements independent of grappling.

21. In a hog scraping machine scraping and supporting means acting to project the carcass upwardly at different times, and rotatable scraping elements acting upwardly on the carcass on opposite sides thereof when in the projected position.

22. In a hog scraping machine scraping mechanisms, and revoluble supporting and dehairing elements adapted to intermittently elevate the carcass into the field of action of the scraping mechanisms.

23. In a hog scraping machine a plurality of rotating scraping mechanisms and a revoluble supporting and dehairing element adapted to intermittently elevate the carcass successively into the field of action of said scraping mechanisms.

24. In a device of the class described supporting and scraping mechanism for a carcass, and a plurality of beater shafts arranged thereabove, said supporting and scraping mechanism elevated at a plurality of points midway between the beater shafts to project the carcass into the field of the beaters.

25. In a machine of the class described a casing, a series of beater shafts arranged one above the other in stepped relation therein, and movable supporting means for the carcass thereberneath and elevated beyond normal at points intermediate said beater shafts.

26. In a machine of the class described a casing partly filled with water, inclined movable supporting means for the carcass partially submerged therein, and elevated out of normal at certain points, and beaters arranged thereabove and adapted to maintain a rotating carcass at said points of elevation on said supporting means.

27. In a device of the class described a conveyer, a track for said conveyer adapted to elevate the same at a plurality of points in its path, and beating mechanism mounted at points intermediate said points of elevation of said conveyer acting to dehair a carcass on said conveyer.

28. In a device of the class described a conveyer adapted to carry carcasses, said conveyer elevated at a plurality of points in its path, and dehairing mechanisms mounted intermediate the points of elevation of said conveyer and acting on the carcass supported thereon.

29. In a device of the class described a conveyer having a tortuous path, and dehairing mechanisms adapted to act on a carcass on said conveyer.

30. In a device of the class described a conveyer having a tortuous path, and a plurality of movable dehairing mechanisms adapted to act on the carcasses carried on said conveyer.

31. In a device of the class described a conveyer having a tortuous path, and a plurality of dehairing mechanisms mounted above said conveyer and adapted to act on a carcass carried thereon.

32. In a device of the class described a conveyer having a tortuous path, and movable dehairing mechanisms mounted above said conveyer and adapted to act on carcasses carried thereon.

33. In a device of the class described a conveyer having a tortuous path, a plurality of dehairing mechanisms adapted to act on a carcass carried on said conveyer, and means throwing certain of said dehairing mechanisms out of operation to permit the passage of a carcass carried on said conveyer.

34. In a device of the class described a conveyer having a tortuous path, a plurality of movable dehairing mechanisms mounted thereabove adapted to act on a carcass on said conveyer and retain the carcass temporarily in a certain position thereon, and mechanisms throwing certain of said dehairing mechanisms out of operation to permit passage of a carcass carried on said conveyer.

In testimony whereof I have hereunto subscribed my name in the presence of two subscribing witnesses.

JOHN W. KOHLHEPP.

Witnesses:
CHARLES W. HILLS, Jr.,
LAWRENCE REIBSTEIN.